Figure 1:
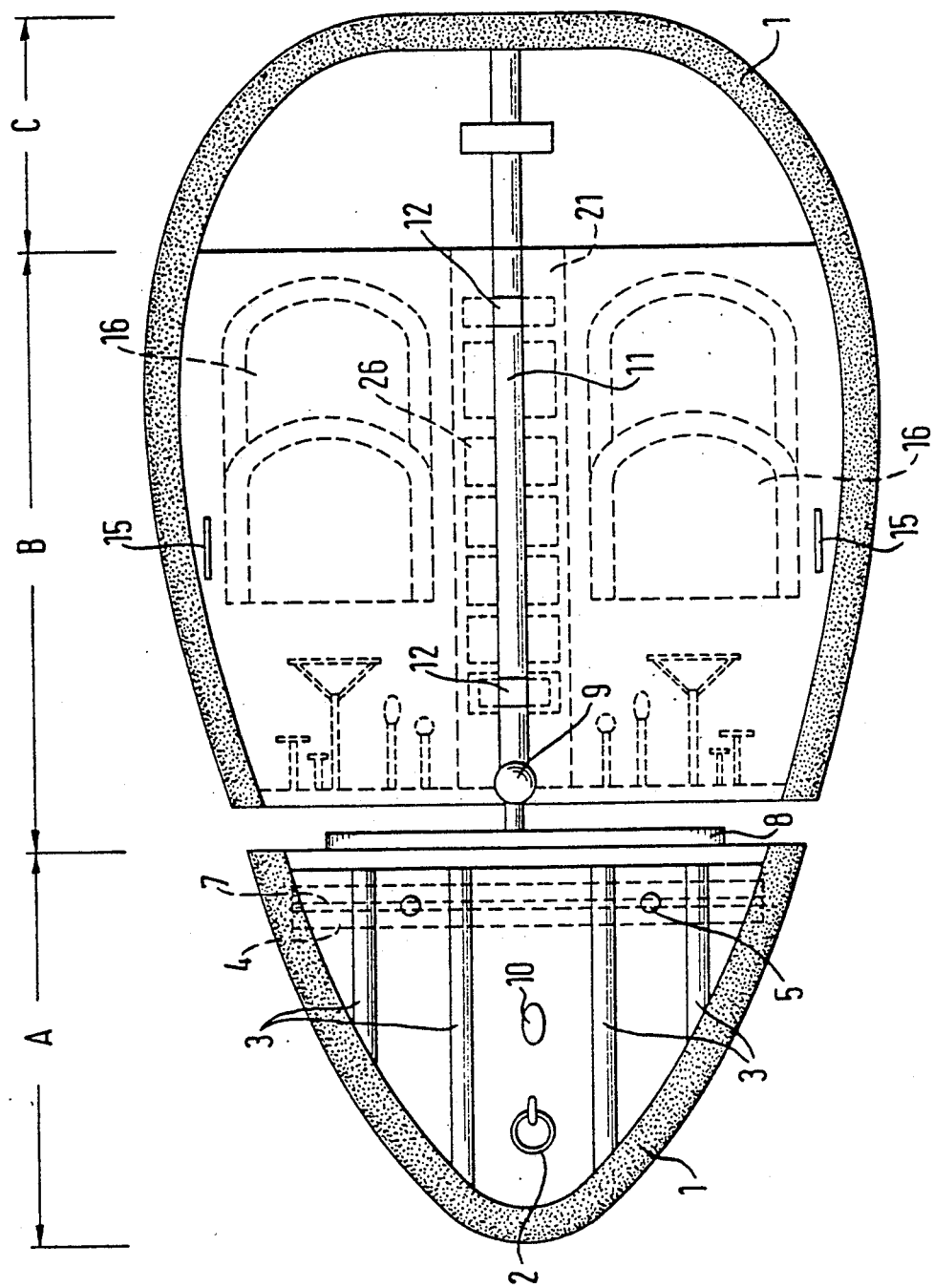

United States Patent [19]
Alino

[11] Patent Number: 5,031,565
[45] Date of Patent: Jul. 16, 1991

[54] TWO-LEVEL SEA-LAND CREEPING VEHICLE

[76] Inventor: Francisco J. L. Alino, Fresnos no. 7 - Urb. Monteclaro, 28023 Madrid, Spain

[21] Appl. No.: 273,458

[22] Filed: Nov. 18, 1988

[30] Foreign Application Priority Data

Nov. 20, 1987 [ES] Spain ........................... 8703322

[51] Int. Cl.$^5$ ............................................. B63G 8/14
[52] U.S. Cl. ................................. 114/332; 114/270; 114/327; 114/331
[58] Field of Search .............. 114/270, 313, 314, 326, 114/327, 328, 329, 334, 335, 332, 331; 440/98; 296/188

[56] References Cited

U.S. PATENT DOCUMENTS

| | | | |
|---|---|---|---|
| 1,298,366 | 3/1919 | Macfie | 114/270 |
| 1,364,545 | 1/1921 | Cook | 114/270 |
| 1,773,210 | 8/1930 | Wallace | 114/332 |
| 3,161,172 | 12/1964 | Kassbohrer | 114/270 |
| 3,446,175 | 5/1969 | Boehler et al. | 114/270 |

FOREIGN PATENT DOCUMENTS 152693 9/1983 Japan ................................. 114/270
717949 11/1954 United Kingdom ............... 296/188

*Primary Examiner*—Sherman D. Basinger
*Assistant Examiner*—Thomas J. Brahan
*Attorney, Agent, or Firm*—Kirkpatrick & Lockhart

[57] ABSTRACT

A two-level sea-land creeping vehicle formed by three main parts: a frustoconical bow portion which is movable independently but connected to the central part or compartment in the form of a drop of water, which is flat in the lower part and which is fixed with respect to the rear part which comprises the drive and steering assembly, as well as the breathing and safety zone.

The vehicle is displaced on land by means of two rollers disposed in the lower region and by the drive of the motor, and it is likewise displaced on the surface of water due to its buoyancy and it is also displaced in a condition of dynamic immersion by the drive of the motor linked to positioning of the bow portion and hydroplanes; the air required is picked up from the surface by means of an appropriate telescopic arrangement and it has the particularity of not being hermetically sealed in the immersed condition. It is totally safe since it rises automatically to the surface when the motor stops.

12 Claims, 10 Drawing Sheets

TWO-LEVEL SEA-LAND CREEPING VEHICLE

The present invention, in accordance with the title of this description, relates to a TWO-LEVEL SEA-LAND CREEPING VEHICLE.

The constructions which are known hitherto in regard to moving bodies or vehicles which are capable of combined use on land and water are amphibious vehicles and air-cushion vehicles and the only thing that they attain by being as sophisticated as they are is that they move over both surfaces, but are never used in an immersion mode.

From another point of view, a previous construction can be considered to be the present submarines which are complicated air-tight vehicles, with expensive air recycling systems and with two serious problems in the event of malfunctioning: one, if the oxygen recycling system fails, a dangerous situation may arise in regard to the level of concentration of CO in the compartment, and in addition that in the event of a failure in the ballast system, the submarine may be immobilised at a great depth.

In addition obviously no submarine is designed to move on the land.

Therefore the creeping vehicle for which application is made has distinguishing features which are so pronounced with respect to the present state of the art briefly summarised above that it is totally in conformity with the Law, in accordance with the description set out hereinafter.

Indeed, the creeping vehicle can be displaced over the surface of the land by means of its support rollers and thrust propeller; it can move over the surface of water by virtue of its floatability and also by virtue of the thrust of the propeller and it can likewise be moved in an immersed condition, that being dynamic immersion, in such a way that if the thrust of the motor stops, the vehicle without dynamic force automatically rises to the surface and always rises thereto since the construction is always such that the weight is less than its displacement, which totally distinguishes it from a conventional submarine, and moreover, if the system for taking air from the exterior, which is how it is supplied with oxygen, is shut down, the engine or motor does not receive air so that it stops, and with the use of dynamic immersion (that is to say, without ballast, but by the combined force of the motor and fins or hydroplanes), the vehicle automatically rises to the surface, which always happens for the reason that the weight thereof is less than its displacement; in addition the concept of immersion vehicles is always linked to that of air-tightness but in this case the vehicle is not hermetically sealed, the sealing doors not going so far as to make it totally sealed and the vehicle not being flooded with water by virtue of the bubble effect induced by the air which passes into it by way of the dynamic air intake system which receives air from the exterior, and the special design of the compartment.

The invention therefore provides a novel and revolutionary design of vehicle capable of moving over the surface of the ground, over the surface of water and in an immersion mode with total autonomy, safety, facility and at low cost, combining the features of the novel design with the joint application of known physical laws.

To provide for improved understanding of this description and forming an integral part thereof, the description is accompanied by a series of drawings in which the Figures, which are of illustrative and non-limiting nature, provide diagrammatic representations of each and every one of the parts of the invention, and the relationship among same.

Figure 2:
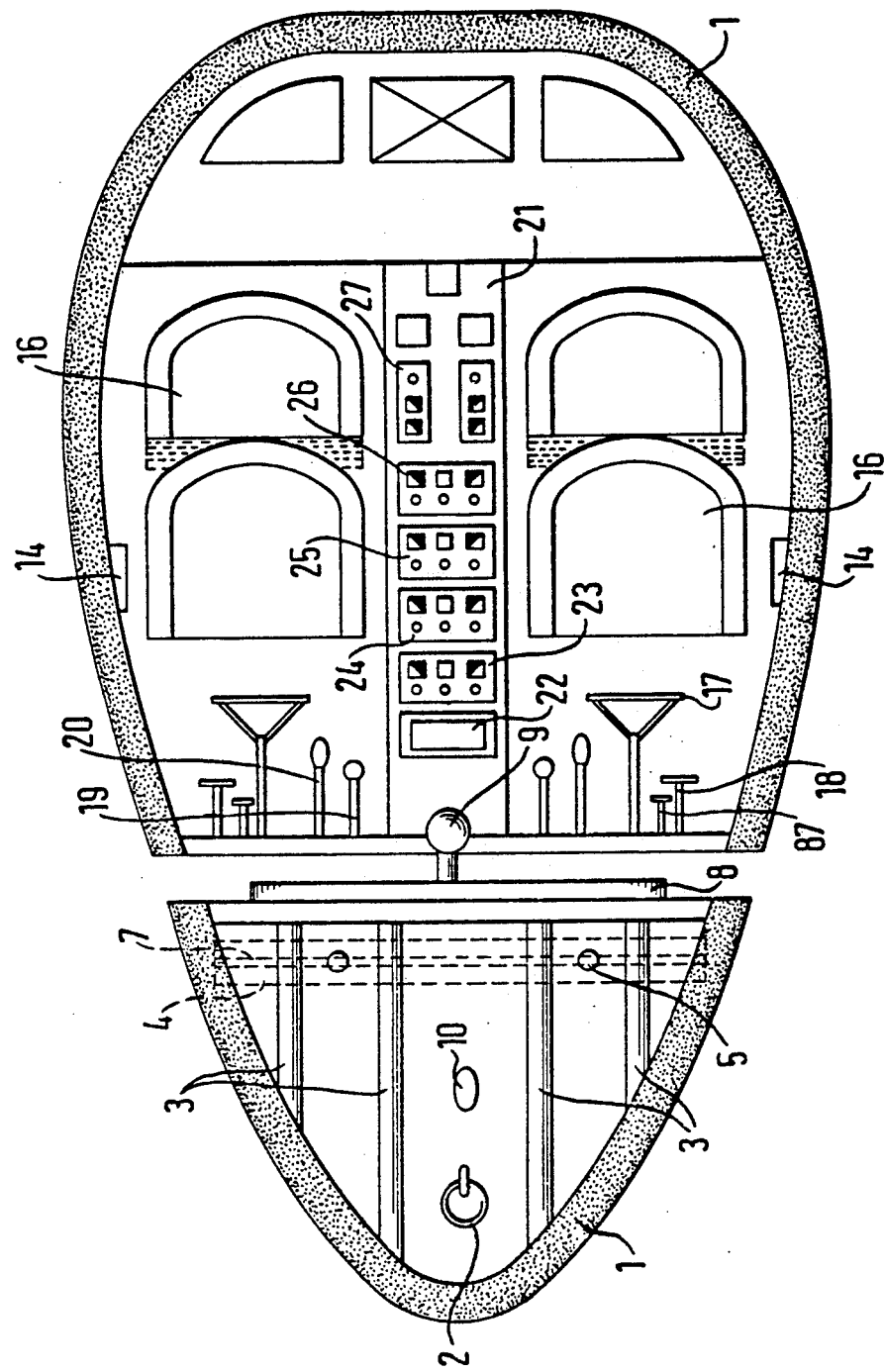
Figure 3:
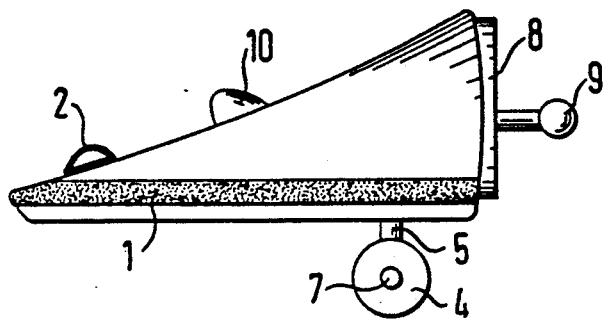
Figure 4:
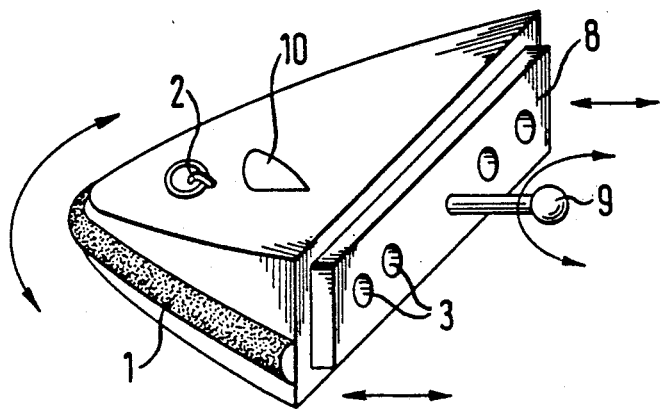
Figure 5:
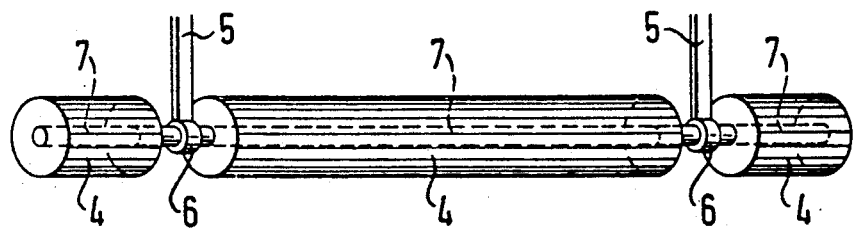
Figure 6:
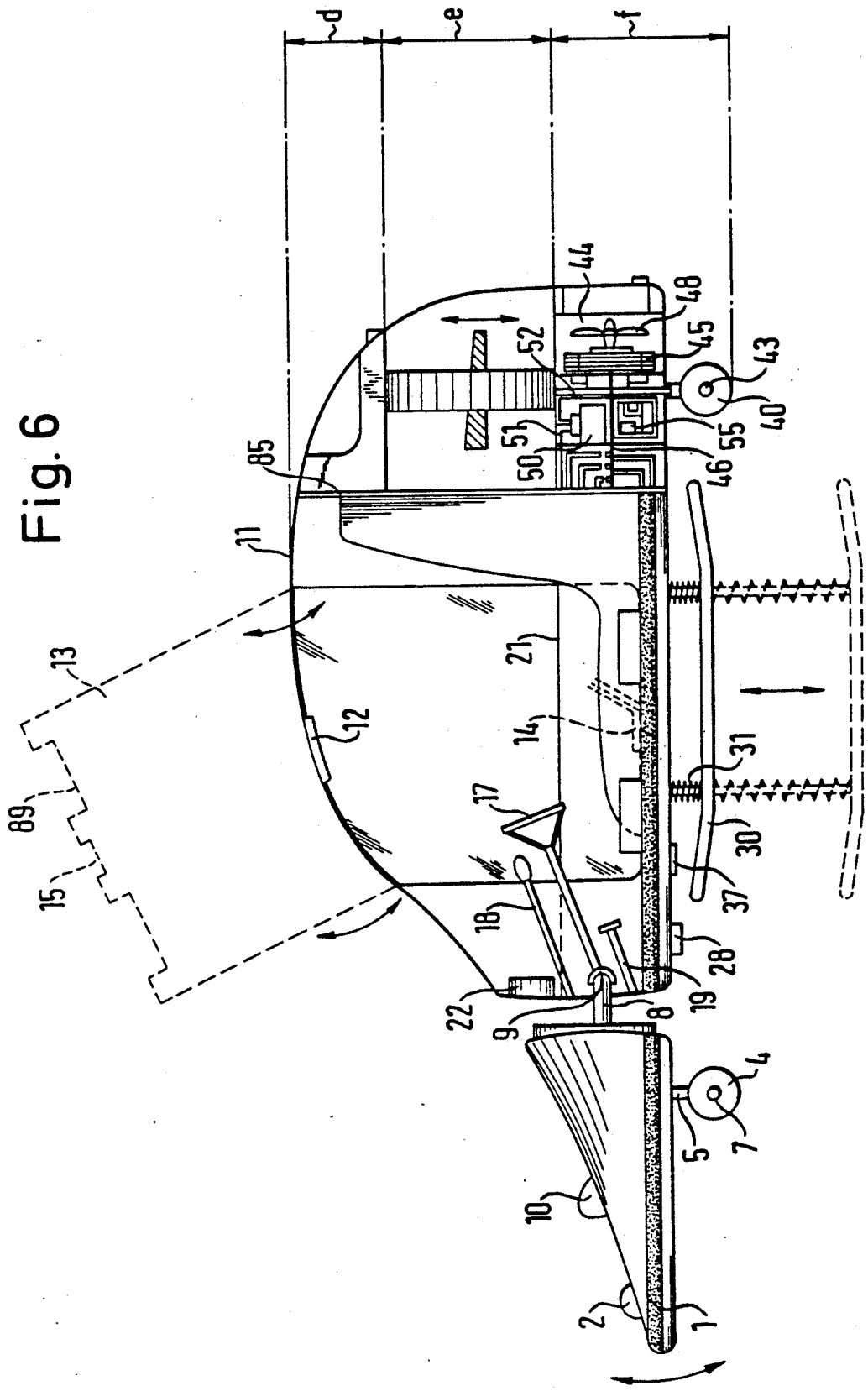
Figure 7:
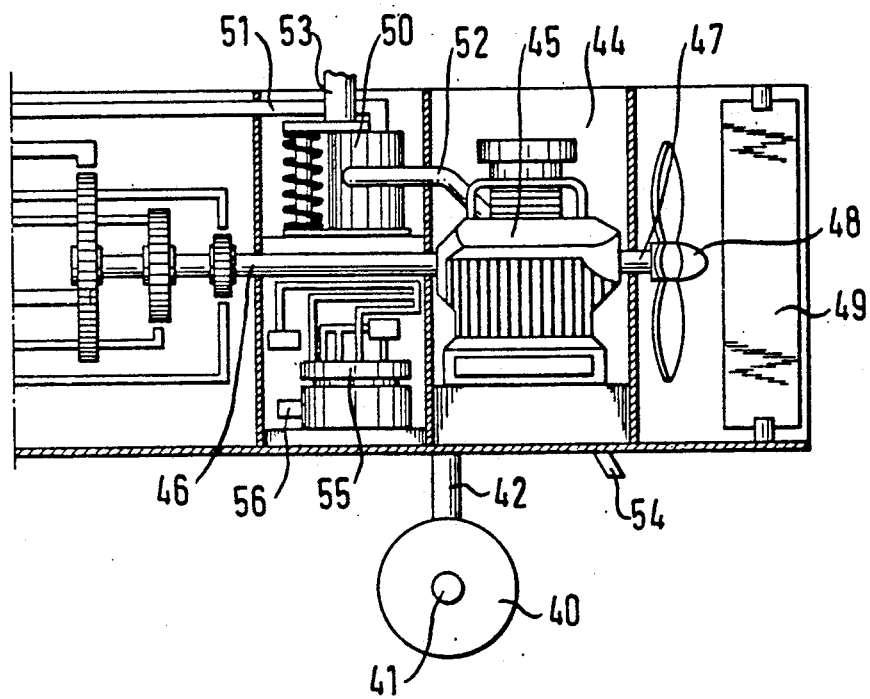
Figure 8:
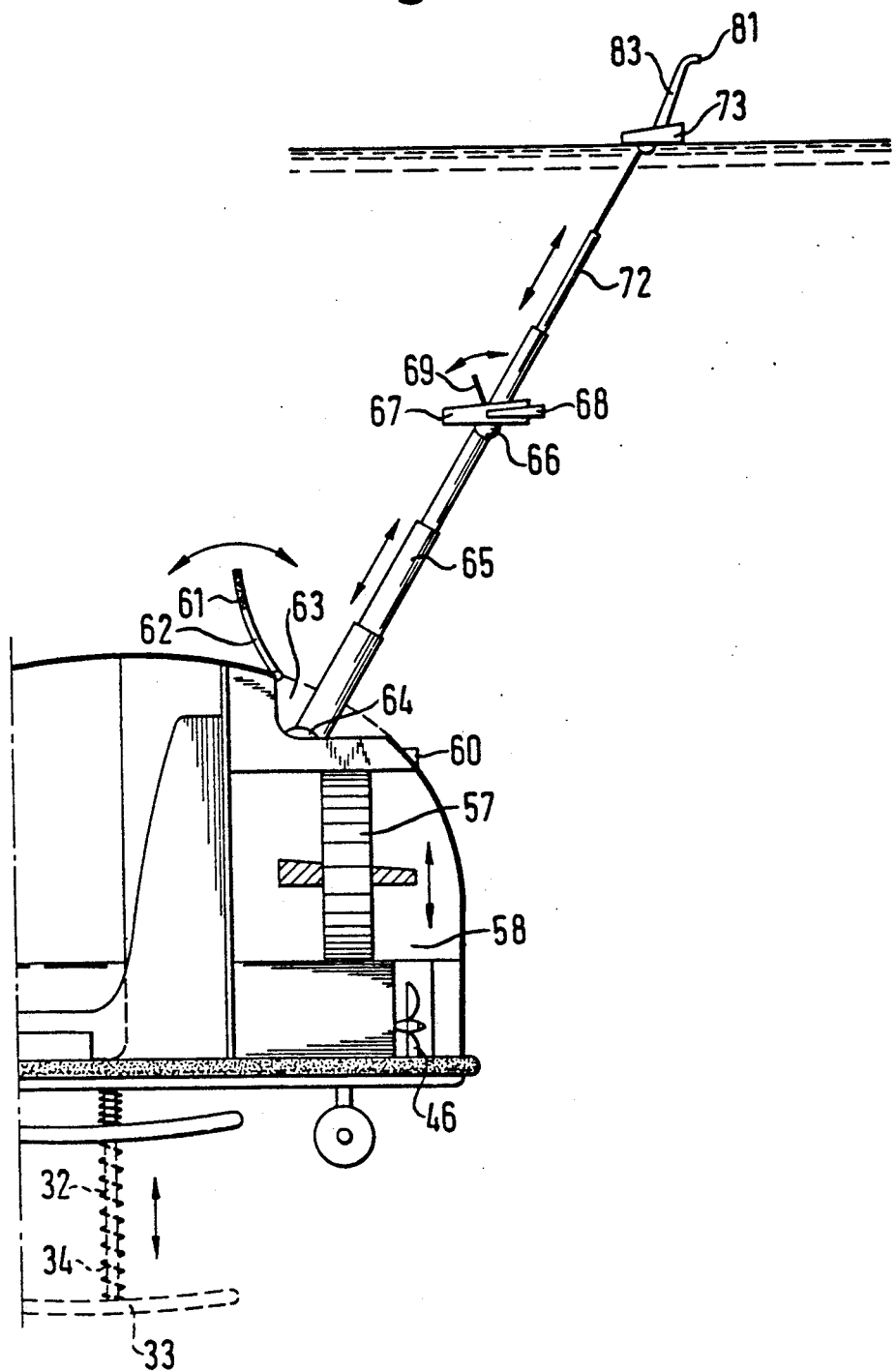
Figure 9:
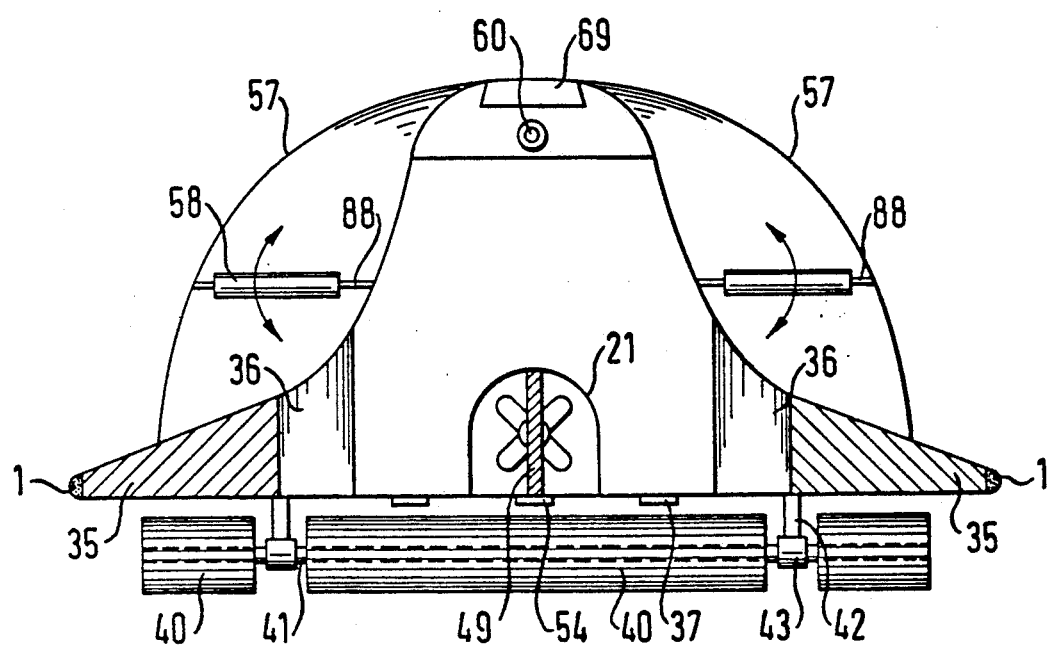
Figure 10:
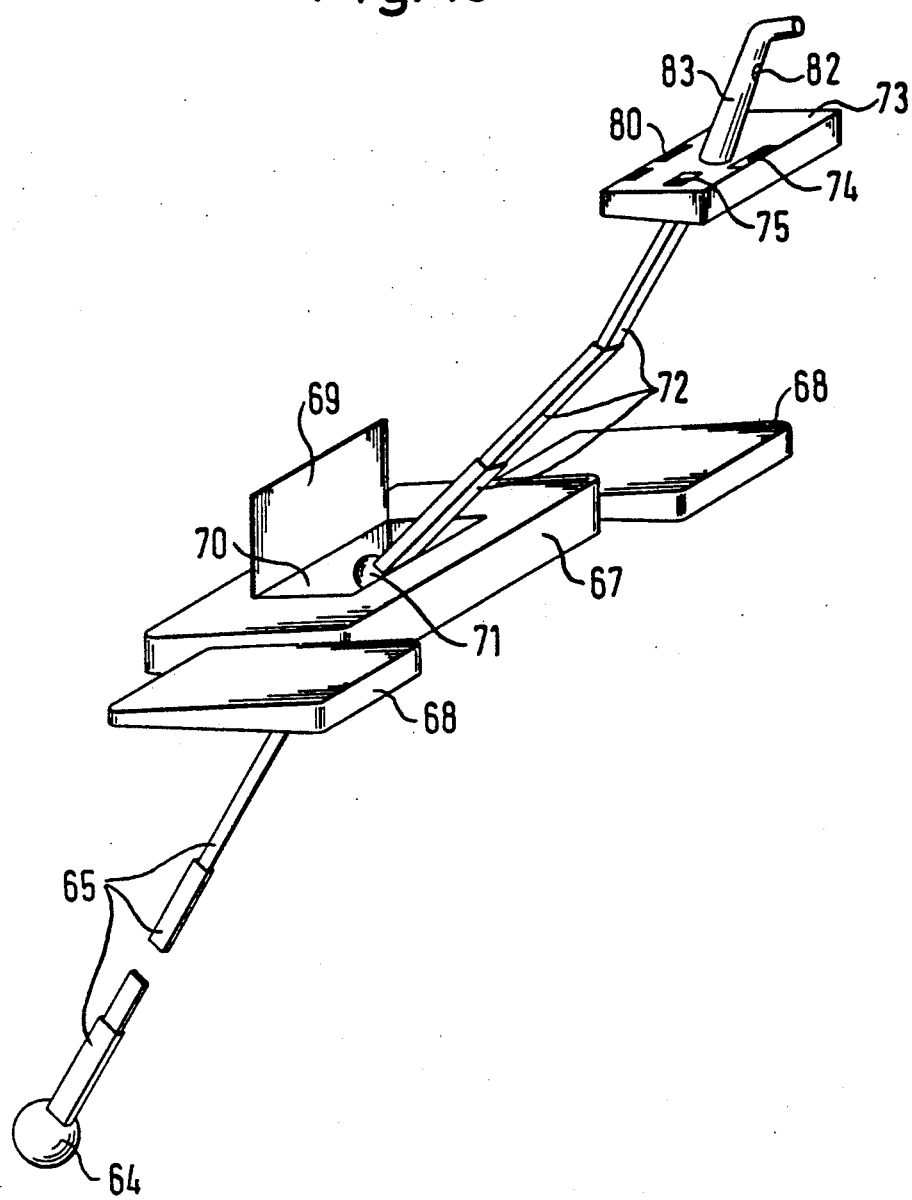
Figure 11:
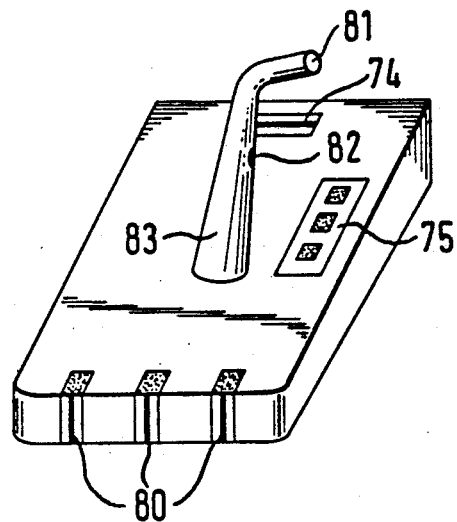
Figure 12:
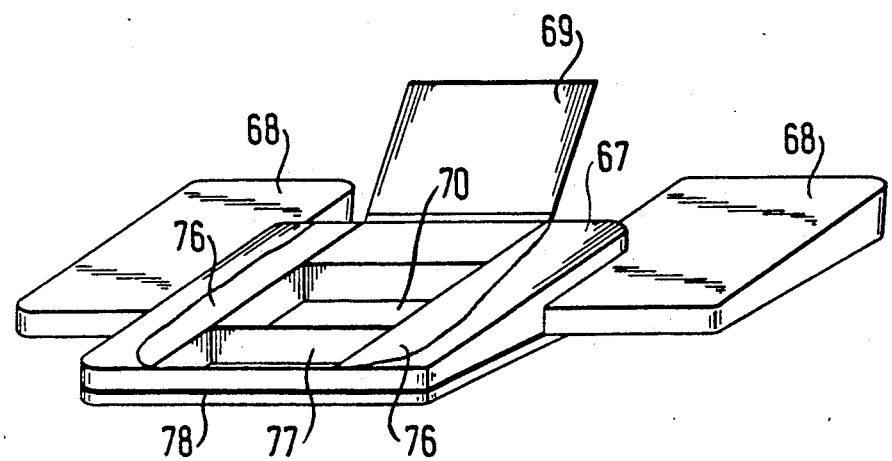
Figure 13:
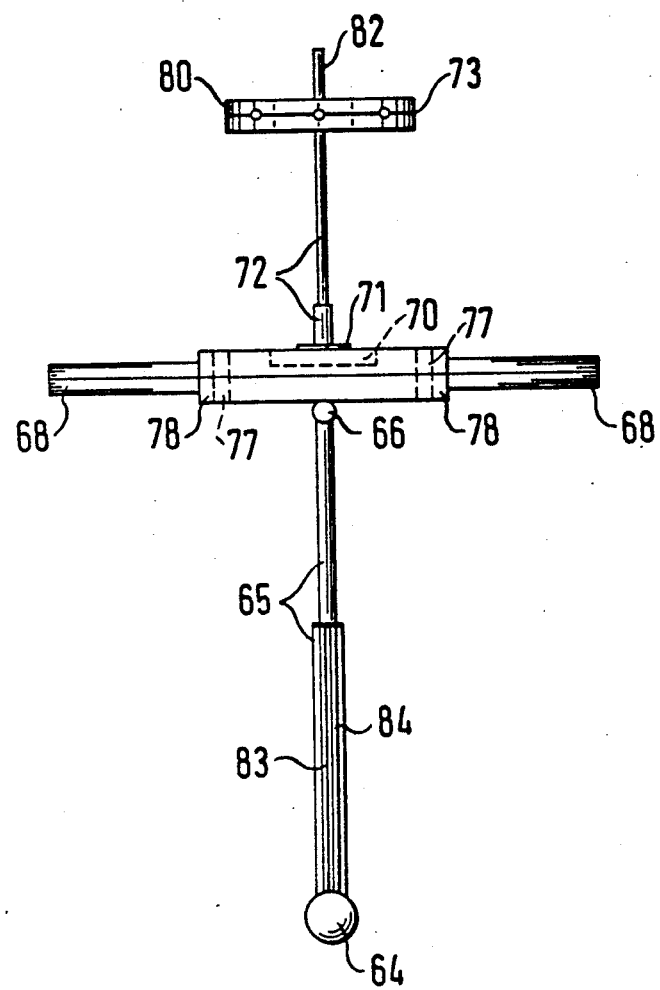

In the accompanying drawings:

FIG. 1 is a plan view of the creeping vehicle showing the three main parts A, B and C, FIG. 2 is a plan view in section through the vehicle in the middle part thereof, FIG. 3 is a side view of part A, being the front part or bow portion of the vehicle, FIG. 4 is a perspective view of part A, being the front part or bow portion of the vehicle, FIG. 5 is a perspective view of the front roller of the vehicle, FIG. 6 is a side view in section of the vehicle, FIG. 7 shows details of the rear part C, in particular in the zone f, FIG. 8 is a side view in section of the rear part of the vehicle showing details of the breathing system in the extended condition, FIG. 9 is a rear view of the vehicle, FIG. 10 is a perspective view of the breathing system in the extended condition, FIG. 11 is a perspective view of the upper part of the breathing system, FIG. 12 is a perspective view of the middle part of the breathing system, and FIG. 13 is a view in section of the breathing system.

The drawings include the following reference characters which are used to denote the same respective components:

A. The front part or the bow portion. The front part is in the shape of a frustoconical wedge with a flat base where it is connected to the region of the compartment B which has the edges of rounded configuration.

The front part which comprises the front roller for sliding movement of the vehicle is totally movable within the limits which the steering equipment permits, and permits the assembly to be inclined upwardly and downwardly relative to the theoretical central plane of the vehicle. In the same way it can be moved slightly in the east-west direction of the same plane; finally it consists of a theoretical axis, and can rotate about its own axis. Those movements are important both on land and in the water, on land in order to be able to avoid obstacles and in the water to act as a bow, keel and stabiliser. In an immersed condition, it is that part which, with its angle of inclination and the thrust of the motor, makes it possible to reach the desired depth and stabilise the course in dependence on its shape and the flow of water through the stabilising ducts or passages thereof. It also serves by virtue of its reserve of buoyancy to maintain the fundamental principle of lower weight than displacement. It will be produced from the same material as the remainder of the vehicle, namely a strong light material which is not subject to the attack by the physical and chemical agents through which the vehicle is going to move and the shape thereof is perfectly integrated into the whole of the vehicle without producing breakdowns and turbulence phenomena in the layer of water which, when the vehicle is immersed, moves over the length of the whole of the vehicle.

The following are distinguished as characteristic elements of this part of the vehicle:

1. Peripheral defence. The peripheral defence is common to the whole of the vehicle and is formed by a profile of a deformable element of rubber, caoutchouc or like type which covers all the major periphery thereof. The defence recovers its natural shape each time after a possible impact and therefore provides for appreciable absorption of the effect of the impact. The defence extends around the vehicle, being disposed at its most outward periphery which is where there is the greatest risk of collision and where the major part of damage can occur if a collision takes place.

2. A ring for salvage, towing, mooring, securing, lifting, etc. The ring is an annular which is firmly fixed to the upper front part, of such a shape that it provides the appropriate strong reference location for each of the above-indicated functions.

3. Stablising ducts or passages. The ducts are formed by cylindrical bores provided under the front part and which pass entirely therethrough, performing on land the function of lightening the weight of the bow portion and in the water serving to stabilise the assembly by virtue of causing water to flow therethrough as well as for imparting handlability thereto, in accordance with the laws relating to the flow of fluids through ducts.

4. Front roller. The front roller which is disposed in the lower rear part of the front part or bow portion is light and cylindrical and is divided into three sections so that the mountings 5 can be fixed between them and they are joined together by means of the common shaft 7 thereof. The roller is the means for supporting the vehicle on land and underwater surfaces, with the assistance of another similar roller mounted in the rear part.

5. As shown in FIGS. 3 and 5, mountings for the front roller as a small damping element 5, for fixing the roller to the lower rear part of the front part or bow portion, and they are connected by their lower portion to the shaft 7 of the roller.

6. Rotary cap portions which are fixed to the mountings and within which the shaft 7 of the roller rotates.

7. Shaft of the roller which is common to the three parts thereof and providing a strong location for fixing of the outer casing of the roller, as well as the mountings 5, by means of the caps 6.

8. Transmission bar formed by a profile member fixed in the rear part of the bow portion which makes it rigid and which also, in combination with the steering ball joint 9, permits it to be disposed in the appropriate position and provides for displacement thereof both in the horizontal axial plane or in the vertical axial plane.

9. Steering ball joint, a simple mechanism which permits the assembly to be disposed in any desired position within the limitations of the pivot connection (plus or minus 170° in all directions).

10. A radial light projector or lamp which is suitably shielded, for use both in and out of water.

B. Compartment. The compartment in the true sense is in the form of a drop of water which is flattened in the lower part forming an edge configuration which is slightly rounded in the rearward part, as can be seen from FIGS. 6 and 7. The shape is the most favourable for movement in an immersed condition and is especially provided for the assembly of breathing elements to produce the bubble effect necessary for perfect operation of the vehicle in the immersed condition. On land, in view of the low speed of movement of the vehicle, the shape of the construction is of less aerodynamic importance.

The slightly rounded shape of its lower part is due to the necessity for it to be displaced on land by means of the rollers and the enlarged configuration for the reason of providing an extensive base for supporting the vehicle when it moves on the surface of water combined with an ample reserve of buoyancy. The compartment is provided with two substantial stiffening elements. One is a semicylinder which is disposed in the lower part of the compartment with the flat part being combined with the flat body of the vehicle and the cylindrical part acting as a tunnel 21 dividing the compartment into two parts, leaving two spaces at both sides of the tunnel which is where the seats for the crew members/occupants are disposed. The semicylinder is hermetically closed except in its final portion where the propeller and the hydroplane-rudder are disposed; all the conduits and systems for control of the vehicle are disposed in the semicylinder. The other stiffening element is an arcuate support and safety member 11 which goes from the front part of the compartment to the rear wall which divides the compartment from the rear zone and which serves as a mounting for the doors. The compartment is also fixed with respect to the rear wall and comprises active safety elements.

The following are characteristic elements of part B:

11. Arcuate safety and support member formed by a slender narrow but strong profile member which starting from the front part of the compartment B finishes by being fixed in the rear part of the compartment 90. The doors 13 are pivoted on that member on the top thereof by means of the upper mountings 12.

12. Mounting for the doors which permits them to be pivoted upwardly, disposed on the member 11.

13. Upwardly opening doors of the gull wing type, which provide the sides of the compartment and which are not sealingly closed since, although they have a safety seal 14, upon being closed they have enlarged lateral openings 89, disposed as low as possible and, although the vehicle is immersed, due to the bubble effect and the pressure in the compartment, a small amount of water can enter, which is immediately removed by way of the corresponding drain valves 37. The outline of the doors is shown by a broken line in FIG. 6. The doors cannot be closed sealingly, as previously described, because of the lateral openings 89. Even if the doors are not sealingly closed, that does not affect general operation of the vehicle.

14. Safety seals.

89. Enlarged openings which remain when the doors are closed, due to the shape of the latter.

15. Anatomical handle for opening and closing doors, in the shape of a slight recess in the compartment in order not to create any break in the sheet of water when the vehicle is travelling in an immersed condition, and which is not liable to become caught up with any external element.

16. Anatomical seats which are disposed at both sides of the tunnel, of such a shape that they are enclosed between the outside walls of the compartment and the tunnel.

17. Steering wheel. Dual control which is disposed in front of each seat 16 which acts on the steering ball joint 9 producing a direct effect on the bow portion A.

18. Lever for moving the bow portion in the up-down direction. There is a lever member at each side of the tunnel in front of the seats 16.

19. A lever for positioning the rear hydroplanes 58. It provides dual control, one at each side of the tunnel 21 and in front of the seats 16 for easier operation.

20. A lever for positioning and operating the hydroplane-rudder 49 which is disposed in line with the propeller 48. The lever 20 is a dual control arrangement, one on each side of the tunnel 21 and in front of the seats 16 for easier operation.

21. Air-tight semicylindrical tunnel. The semicylindrical tunnel, the flat part of which is disposed on the floor of the vehicle with the semicircular part extending upwardly to divide the compartment into two parts, being sealed from the front part where it begins to the propeller at the opposite rearward end. Disposed within the tunnel are all the transmission means, conduit means, sensor elements etc. of the assembly, in brief all the delicate elements which could suffer damage in contact with external agents. At the same time it also acts as a structural element to increase the rigidity of the assembly. The various control and actuating means of the creeping element 23, 24, 25, 26, 27 and 28 can be seen on the tunnel and the whole assembly of transmission means and conduit means 29 thereof can be seen in its interior.

22. Video monitor for selecting the different views of the camera 60 and video pick-ups 80 which are disposed in the rearward part and the breathing assembly respectively.

23. Commands and controls for the motor.

24. Commands and controls for electricity and lights.

25. Commands and controls for navigation purposes, that is to say speed, depth, inclination and bearing.

26. Safety controls and commands.

27. Controls and indicators for physiological monitoring of the medium and the occupants.

28. Directable radial light projector or lamp which is disposed preferably in the lower portion of the front part.

29. Assembly of transmission means and conduit means from and to the various control members.

30. Safety plate consisting of a strong rectangular plate with bevelled corners, disposed in the lower portion of the front part B and connected thereto by means of the springs 31 and the tensioning means 32.

31. Springs which connect the safety plate 30 and the lower portion of the front part 13 and which consist of large strong spring members which are compressed by means of the tensioning means 32 and which, when they are allowed to act, project the safety plate 30 in opposite relationship to the floor of the vehicle, with a great deal of violence, thus, by an action-reaction effect, flinging the vehicle upwardly and freeing it from a possible obstruction, which operation can be performed as many times as may be necessary.

32. Hydraulic tensioning means for the springs, which are mounted on the lower portion of the front part and which compress the springs 31, the operator being able to free the above-mentioned springs from the interior as well as providing for compression thereof whenever necessary.

33. Safety plate used with the springs at maximum elongation thereof.

34. Springs 31 in their condition of maximum elongation.

35. Safety buoyancy zone disposed over the entire length of the front part B.

36. Main fuel tanks disposed on both sides of the tunnel 21 and protected externally by the safety buoyancy zone 35.

37. Drain valves for the discharge of water from the compartment. They are simple valves which operate by a venturi effect, due to the depression created by the sheet of water as it passes over the valve. There are at least two thereof, disposed in the lowest part of the compartment, one on each side of the tunnel 21.

C. Rear part. The rear part is fixed with respect to the compartment, forming an assembly therewith and being separated therefrom by a strong wall. The rear part comprises three zones which are differentiated from each other, as follows:

f. Lower zone which contains the motor compartment, within the tunnel 21 for stiffening the vehicle, combined with the turbo-compressor and the hydraulic generating system. Disposed at the output of the motor is the propeller 48 whose drive flow acts directly on a hydroplane-rudder 49 with a steering effect. Mounted beneath that lower portion is the second roller, referred to as the rear roller, which is identical in its characteristics to the front roller and which is mounted in the same way by means of the mounting which goes from the shaft of the roller to the lower portion of the rear part. The zone f is likewise provided with fuel tanks around the tunnel and buoyancy reserves in the enlarged part of the compartment.

e. The intermediate stability and control portion e which is provided with arcuate safety members which at the same time are stabilisers, disposed symmetrically at both sides of the vehicle, and which extend from the upper part and form a semicircular arc in a plane perpendicular to the axial direction of the vehicle, being mounted at the outward end of the above-mentioned buoyancy reserve, and in the middle part thereof carrying a hydroplane in the form of an orientable aircraft wing which provides a stabilisation and control effect for the assembly.

d. The upper portion d of the rear part C, referred to as the safety and control portion, is formed by a video camera in the manner of a rear view mirror, and the breathing and safety zone which is under a cover totally integrated into the general profile of the vehicle.

Once the cover is lifted, which holds the breathing valve for when the vehicle is not submerged and the whole assembly is extended, we can see that from the bottom upwardly it is formed by telescopic elements which support the safety and control tank formed by an aircraft wing-like member with stabiliser and buoyancy hydroplanes, that member comprising two additional fuel tanks and another oxygen tank and likewise comprising a receptacle from which extend other telescopic elements which support another aircraft wing-like member in which there is disposed a radial lamp, sensors for sensing ambient conditions, an additional video pick-up and an air intake in the form of a periscope which is oriented in the opposite direction to the direction of travel so that when the vehicle is travelling in an immersed condition, even if there is a slight swell and even if the member which supports it is of high buoyancy, splashes of water should not affect it.

Likewise all that assembly carries in its interior the appropriate conduit means, one being provided for carrying air directly to the turbo compressor and another for hydraulic power, transmission of signals, electrical cables, video cables etc.

The following components can be seen in the lower part f:

40. Rear roller. This of the same characteristics as the front roller.

The rear roller which is disposed in the lower portion of the rear part C is formed by a light cylinder which is divided into three sections so that the mountings 42 can be fixed between them and which are joined together by means of the common shaft 41. The roller is the means for supporting the vehicle on land and on underwater surfaces, with the assistance of the corresponding front roller.

41. Shaft of the roller, which is common to the three parts thereof and being a strong location for mounting of the outside casing portion of the roller as well as the mountings 42 by means of the end caps 43.

42. Mountings for the rear roller, with a slight damping element, being those which fix the roller to the lower rear part of the vehicle.

43. Rotary end caps fixed to the mountings and within which the shaft 41 of the roller rotates.

44. Motor compartment; disposed in the rear part of the tunnel 21 which contains the motor 45, a turbo compressor 50, a hydraulic generating system 55 and multiple outlet openings.

45. Motor, housed in its compartment 44, which can be mounted in different positions depending on the weight of the propeller and the type thereof.

46. Front output shaft of the motor which supplies power for the turbo compressor 50 and the system 55.

47. Rear output shaft of the motor which drives the propeller 48.

48. Propeller which supplies the dynamic thrust for the vehicle.

49. Hydroplane-rudder mounted in the rear part of the tunnel 21; the movable portion of the hydroplane-rudder, by means of the propeller 48, steers the vehicle.

50. A turbo compressor which is driven by means of the front shaft of the motor and which drives the air which comes from the exterior to the motor and the compartment, in order for the bubble effect to function perfectly.

51. Air outlet of the turbo compressor to the compartment.

52. Air outlet from the turbo compressor to the motor.

53. Air inlet from the exterior to the turbo compressor.

54. Non-return escape valve of the motor through which issue the gases from combustion when an internal combustion engine is used as the motor.

55. Hydraulic generating unit which supplies hydraulic power to all the system.

56. Multiple connection of the hydraulic generating unit which permits hydraulic pressure to be supplied to distant operating units.

e. Intermediate zone of the rear part C which includes the arcuate safety members 57 and the stabilising hydroplanes 58.

57. Arcuate safety, reinforcing and stabilisation members which consist of two arcuate members which, starting from the upper part of the compartment, finish at the lateral edges, forming a semicircle perpendicular to the horizontal plane of the vehicle in the rear part thereof. The arcuate members comprise stabilising hydroplanes 58 in a horizontal plane parallel to that of the vehicle.

58. Stabilising hydroplanes formed by a profile member in the form of an aircraft wing, supported by a shaft 88 mounted on the arcuate safety members 57, thus permitting the hydroplane to turn through 180°, as required.

88. Shaft for rotary movement of the hydroplanes.

85. Divider wall between A and B.

86. Brake for the rear roller, which is required for when the vehicle is travelling on land.

87. Lever for the brake which acts on the rear roller.

d. Breathing and control zone. This zone is the most important of the vehicle and is made up of the following parts:

60. Rear video camera, with movement through 360°, the images thereof being transmitted directly to the monitor in the compartment.

61. Cover of the breathing and control receptacle, which is totally integrated within the structure of the vehicle.

62. Air intake valve for when the vehicle is moving, on land or on the surface of water.

63. Receptacle for the safety tank which contains both the safety and control tank 67 and the signalling and air intake assembly.

64. Ball joint for directing the assembly, which permits said assembly to adopt the most favourable position, depending on the depth of immersion, speed and other conditions.

65. Telescopic elements which are progressively extended as the vehicle descends to increasing depth and which are of triangular shape or of a configuration in the form of a drop of water in order to offer the minimum resistance to movement through the water.

66. Ball joint for orientation and stabilisation of the safety and control tank.

67. Safety and control tank. This tank is formed by an open receptacle 70, see FIG. 10, which contains the remainder of the elements of the breathing and air intake assembly, being suitably closed by a cover 69, and including stabiliser hydroplanes 68 and the two auxiliary fuel tanks 76, see FIG. 12, and an auxiliary oxygen tank 77.

68. Stabiliser hydroplanes for the tank 69 and which are in one piece therewith and which moreover are provided with a substantial buoyancy reserve. The aircraft wing-like configuration thereof provides that it affords minimum resistance to movement through the water.

76. Auxiliary fuel tanks for emergency situations.

77. Auxiliary oxygen tank for emergency situations.

78. Safety buoyancy zone.

69. Cover for the safety and control tank, totally integrated into same when it is closed.

70. Compartment which accommodates the signalling and air intake assembly.

71. Ball joint for orientation of the assembly, which permits the assembly to adopt the most favourable position, depending on the conditions in respect of depth and speed.

72. Telescopic elements which support the signalling and air intake assembly, which are extended as required and whose profile, being triangular or in the form of a drop of water, contribute to affording minimum resistance to movement through the water.

73. Signalling transmitter and air intake, essentially characterised by being formed by an aerodynamic profile in which all the following elements are integrated:

74. Light emitter; for illumination and signalling. It is for signalling for when the vehicle is navigating in a submerged condition to show where it is and where it is moving to; and for illumination in any necessary situation.

75. Ambient condition sensors which transmit to the compartment all necessary signals for when the vehicle is navigating underwater.

80. Video pick-ups for transmitting to the passenger compartment the images which are shot at the surface when the vehicle is travelling underwater.

81. A safety air intake formed by a small tube in the form of a periscope with the opening thereof facing rearwardly so that splashes as the vehicle moves forward or a slight swell do not affect it, being provided with a non-return valve 82 so that if the vehicle is submerged to a greater depth than the safe depth, no water enters through the safety assembly.

82. Non-return valve disposed in the safety air intake 81.

83. Conduit carrying air directly to the turbo compressor.

84. Assembly of conduits to the compartment.

Having regard to the foregoing description it should be noted that the details involved in carrying the idea of the invention into effect as set forth hereinbefore may be varied, that is to say they may be the subject of minor alterations still based on the fundamental principles of the idea which are in substance those which are reflected in the paragraphs of the foregoing description and which are summed up in the following claims.

What is claimed is:

1. A sea-land creeping vehicle, comprising:
a main compartment;
an aerodynamically shaped bow portion having a substantially flat base and rounded edges, said bow portion having passages extending therethrough over the entire length thereof for stabilizing and lowering the weight of the vehicle, said bow portion carrying a front roller for creeping on land;
means for connecting said bow portion to said main compartment such that said bow portion is movable independently of said main compartment, said means for connecting including a horizontal steering bar carried on the side of said bow portion which faces said main compartment and a ball joint projecting therefrom into said main compartment such that movements necessary for handling the vehicle are transmitted to the bow portion by means of said ball joint and said steering bar, said means for connecting permitting said bow portion to be positioned to enable the vehicle to be dynamically submerged; and
a rear portion connected to said main compartment, said rear portion carrying a rear roller for creeping on land.

2. The sea-land creeping vehicle as claimed in claim 1 wherein said main compartment has an aerodynamically shaped outer surface which is flattened at its lower part and at its rear in such a way that the lower part is enlarged to form a concave curvature forming a small hydroplane which operates as an aid for stability, and wherein fuel tanks are located towards the interior of the vehicle and a safety buoyancy reserve is located at its perimeter, said outer surface being produced of a transparent material and provided with two stiffening systems, a first stiffening system formed by a sealed semicircularly shaped tunnel having a flat part forming a part of the floor of said main compartment, said tunnel adapted to accommodate in its interior hydraulic and electrical lines; a second system for stiffening being formed by an arcuate support and safety member which is mounted in the front part of said tunnel and extends to the rear wall of said main compartment and which forms the separation between said main compartment and said rear portion in such a way that said arcuate member is of small width and is integrated into the structure of said main compartment.

3. The sea-land creeping vehicle as claimed in claim 1 wherein said main compartment hingedly carries two doors, when closed said doors define symmetrical spaces such that, when the vehicle is immersed, a small amount of water passes into said main compartment through said spaces, the amount of water being limited by the force of the air pressure in said main compartment, said main compartment additionally comprising drain valves disposed in the bottom of the compartment which operate in accordance with a venturi effect to remove the small amount of water.

4. The sea-land creeping vehicle as claimed in claim 1 additionally comprising various controls disposed in said main compartment, said controls including a steering wheel which operates said ball joint, a lever which operates a rear hydroplane, another lever which operates a hydroplane/rudder, and another lever for upward and downward movement of said bow portion, said main compartment also having in its lower outward part a plurality of springs which are held in a condition of tension by means of a plurality of hydraulic tensioning means and which act on a rigid safety plate so that when the tensioning means are released the springs catapult the safety plate downwardly to throw the vehicle upwardly.

5. A sea-land creeping vehicle as claimed in claim 1 wherein said rear portion is divided into three zones, a lower zone which includes a turbocompressor, a motor, and a propeller; a central zone; and an upper zone; said rear portion also carrying an air intake for said turbocompressor, an air outlet for said main compartment, and an air outlet for said motor, said turbocompressor providing air to said motor, said motor having two shafts, one for driving said turbocompressor and the other for driving said propeller.

6. The sea-land creeping vehicle as claimed in claim 5 wherein said central zone is formed by arcuate safety and stabilizing members disposed symmetrically at both sides of the vehicle and which form a semicircular arc, said central zone carrying a shaft mounted perpendicularly to the theoretical axial plane of the vehicle, said shaft rotatably carrying hydroplanes in the profile of an aircraft wing which permit stabilization and control of the vehicle.

7. A sea-land creeping vehicle as claimed in claim 5 wherein said upper zone includes a receptacle carrying breathing and telemetry apparatus which includes the following: interconnected triangular telescopic elements extending from an orientation ball joint, said elements terminating in a further fixing and orientation ball joint disposed in the lower part of a safety and control tank which is in the form of an aircraft wing and which at its sides has two small aerodynamic fins which serve as stabilizers for said tank and as a buoyancy reserve, said safety tank carrying auxiliary fuel and air tanks and a signalling and air pickup assembly which is closed off by a corresponding cover, when that cover is raised further telescopic elements emerge terminating in an orientation and supporting ball joint which is integrated within a signal-emitting and air pickup unit which is in the form of an aircraft wing and in which there is provided: a light, sensors for sensing ambient conditions, a video pickup, and an air pickup with a safety valve.

8. The sea-land creeping vehicle as claimed in claim 5 characterized in that the immersion condition is dynamic in nature and is effected by means of said motor, and whenever the safety depth is exceeded the air intake system closes and prevents air from reaching the motor so that it stops thereby causing the vehicle to automatically rise to the surface.

9. The two-level sea-land creeping vehicle as claimed in claim 1 additionally comprising a peripheral defence formed by a deformable element which provides for appreciable absorption of the kinetic energy of impacts, said defence extending around the vehicle over the whole of its outside periphery.

10. The sea-land creeping vehicle as claimed in claim 1 wherein said bow portion additionally carries a light on its upper front part.

11. The sea-land creeping vehicle as claimed in claim 1 wherein said bow portion additionally carries in its upper front part a mooring ring.

12. The sea-land creeping vehicle of claim 1 wherein said front roller is a light, hollow, cylindrical roller divided into three parts on a common shaft, said shaft being carried by fixed mountings extending from said bow portion in the gaps between the three parts forming the roller.

* * * * *

UNITED STATES PATENT AND TRADEMARK OFFICE
CERTIFICATE OF CORRECTION

PATENT NO. : 5,031,565
DATED : July 16, 1991
INVENTOR(S) : Dr. Francisco Jose Lopez-Ibor Alino It is certified that error appears in the above-identified patent and that said Letters Patent is hereby corrected as shown below:

ON TITLE PAGE:

At the top of the page, delete "Alino" and substitute --Lopez-Ibor Alino-- therefor.

For "Inventor", delete "Francisco J. L. Alino" and substitute --Francisco Jose Lopez-Ibor Alino-- therefor.

Signed and Sealed this

Twenty-third Day of June, 1992

*Attest:*

DOUGLAS B. COMER

*Attesting Officer*      *Acting Commissioner of Patents and Trademarks*